United States Patent
Sugisawa

(10) Patent No.: US 10,326,266 B2
(45) Date of Patent: Jun. 18, 2019

(54) INTERRUPTING DEVICE, INTERRUPTING METHOD, AND COMPUTER PROGRAM

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yuuki Sugisawa, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/552,909

(22) PCT Filed: Feb. 23, 2016

(86) PCT No.: PCT/JP2016/055188
§ 371 (c)(1),
(2) Date: Aug. 23, 2017

(87) PCT Pub. No.: WO2016/136713
PCT Pub. Date: Sep. 1, 2016

(65) Prior Publication Data
US 2018/0034259 A1   Feb. 1, 2018

(30) Foreign Application Priority Data
Feb. 27, 2015  (JP) .................................. 2015-038914

(51) Int. Cl.
*H02H 3/08*   (2006.01)
*B60R 16/02*  (2006.01)
(Continued)

(52) U.S. Cl.
CPC .............. *H02H 3/085* (2013.01); *B60R 16/02* (2013.01); *H02H 5/041* (2013.01); *H02H 6/00* (2013.01)

(58) Field of Classification Search
CPC . H02H 3/085; H02H 5/04; H02H 6/00; B60R 16/02
(Continued)

(56) References Cited

U.S. PATENT DOCUMENTS

2011/0019325 A1* 1/2011 Nakamura ............ H02H 6/005
                                                              361/93.8
2012/0022708 A1* 1/2012 Higuchi ................ H02J 7/0031
                                                              700/293

FOREIGN PATENT DOCUMENTS

JP   2009-232610 A   10/2009
JP        5381248 B2   10/2013
JP   2014-209834 A   11/2014

OTHER PUBLICATIONS

Search Report for PCT/JP2016/055188, dated May 10, 2016.

* cited by examiner

*Primary Examiner* — Yazan A Soofi
(74) *Attorney, Agent, or Firm* — Hongiman LLP

(57) ABSTRACT

In an interrupting device, a CPU temporally calculates a temperature difference between an ambient temperature of an electrical wire and an electrical wire temperature, based on current information indicating a value of current flowing through the electrical wire, and adds the ambient temperature of the electrical wire to the calculated temperature difference. In this way, the CPU temporally computes the electrical wire temperature. In the case where the electrical wire temperature computed by the CPU is greater than or equal to a threshold temperature, a FET turns off and current flowing through the electrical wire is interrupted. The CPU (Continued)

suspends computation of the electrical wire temperature, in the case where the calculated temperature difference is less than a reference temperature difference and the current value indicated by the current information is less than a reference current value.

8 Claims, 5 Drawing Sheets

(51) Int. Cl.
  *H02H 5/04* (2006.01)
  *H02H 6/00* (2006.01)
(58) Field of Classification Search
  USPC .......................................................... 701/33.9
  See application file for complete search history.

[FIG. 1]
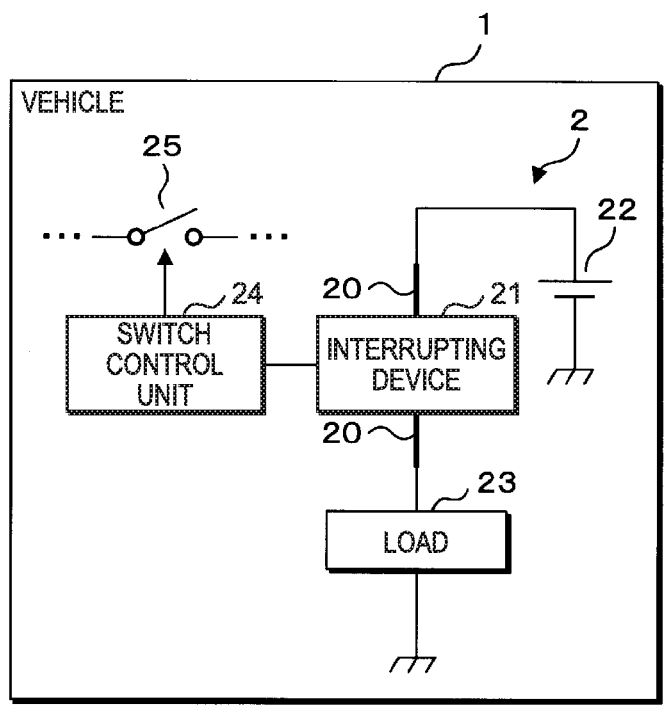

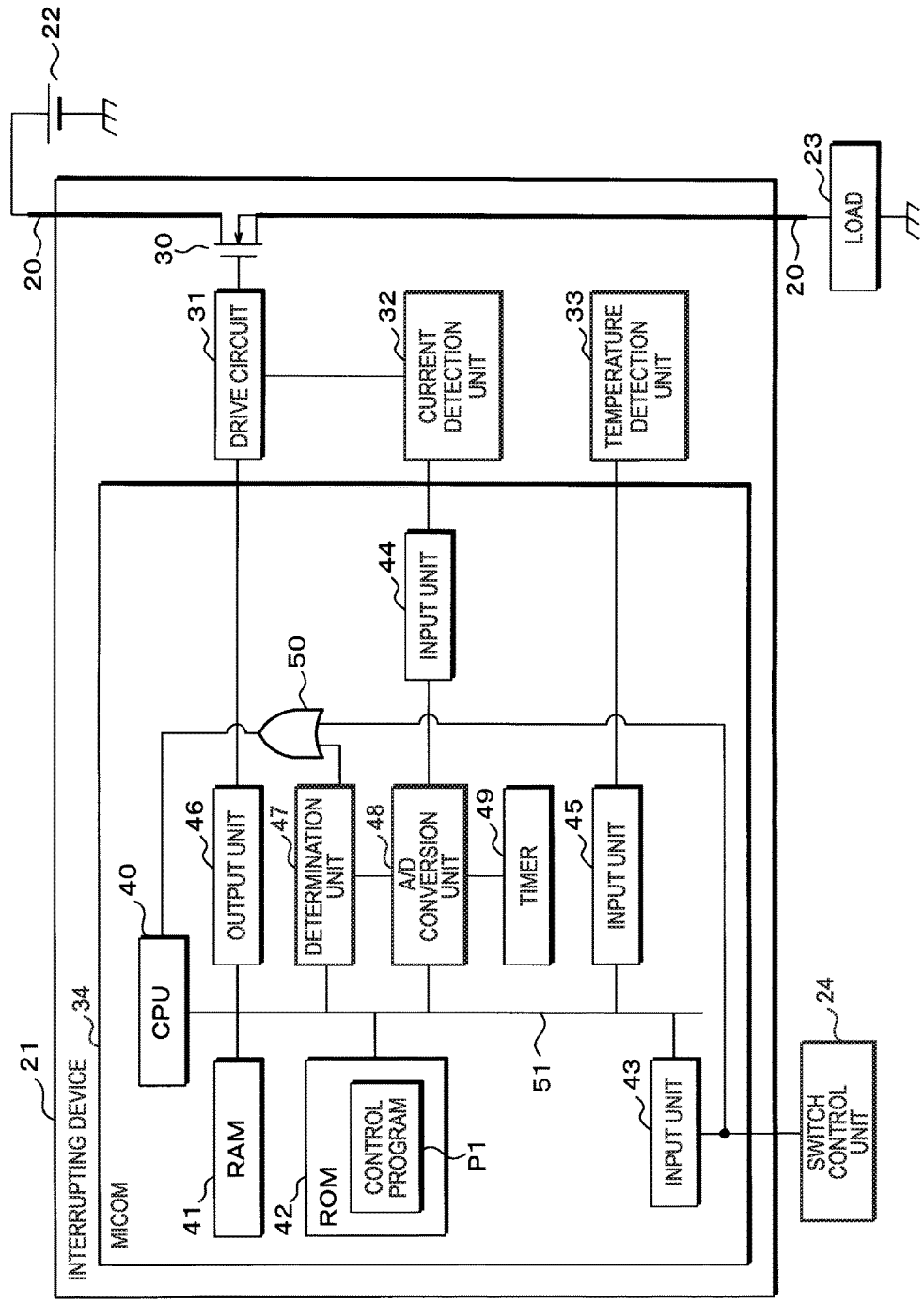
[FIG. 2]

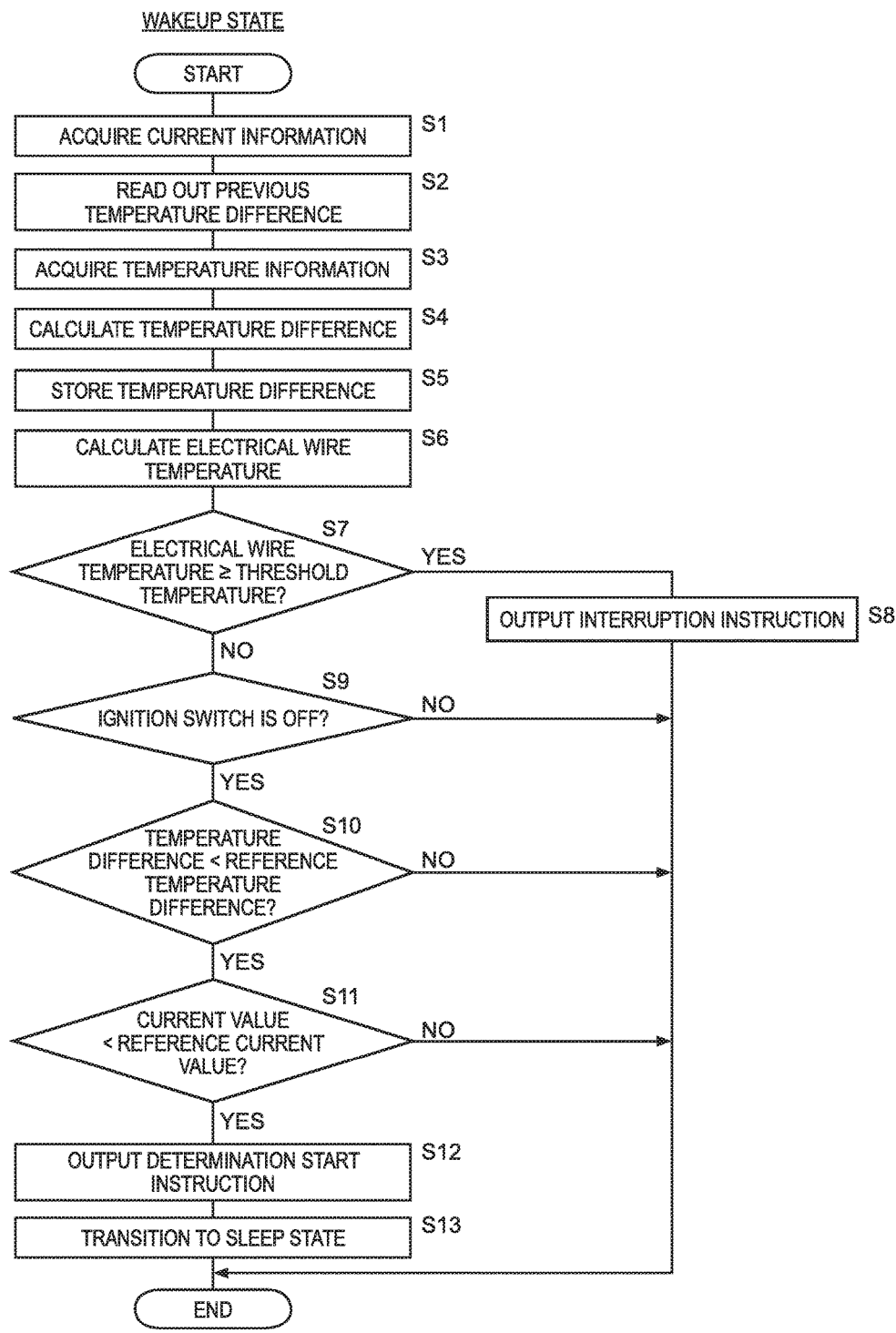
[FIG. 3]

[ FIG. 4 ]
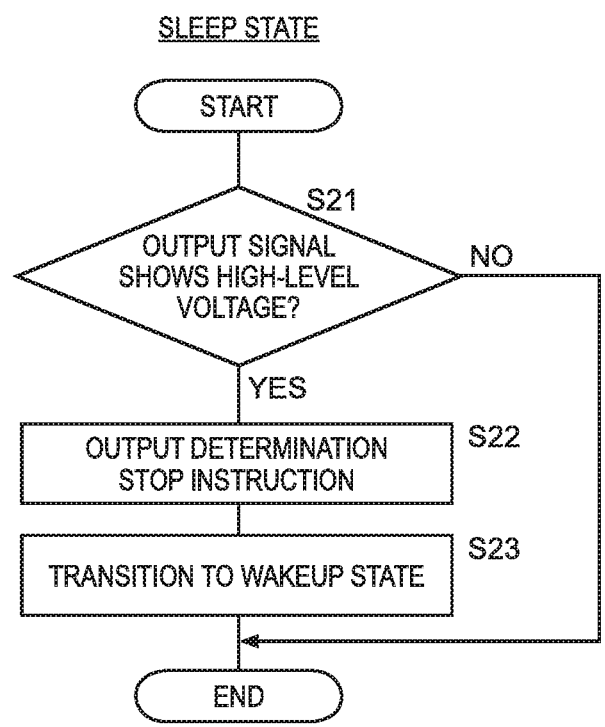

[FIG. 5]
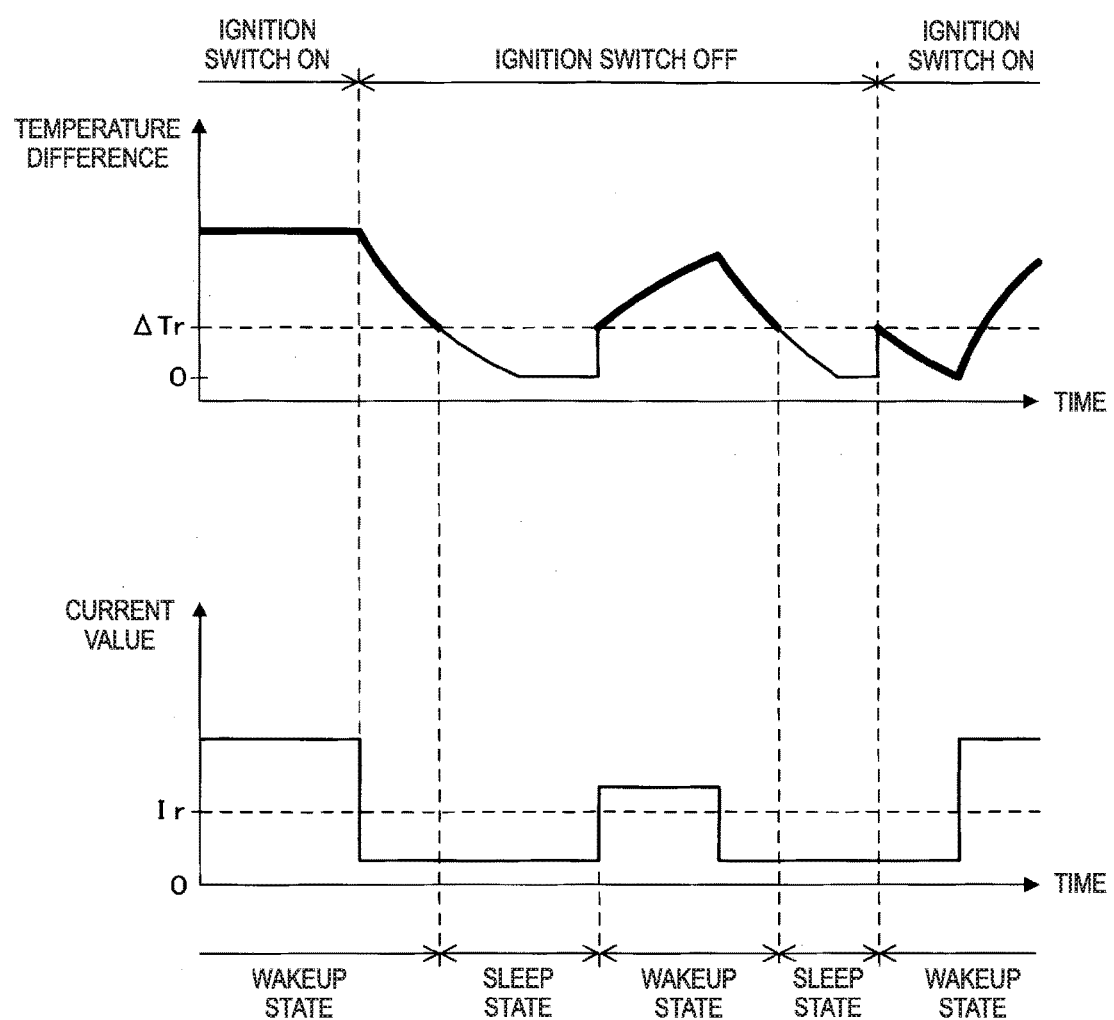

INTERRUPTING DEVICE, INTERRUPTING METHOD, AND COMPUTER PROGRAM

CROSS-REFERENCE TO RELATED APPLICATIONS

This application is the U.S. national stage of PCT/JP2016/055188 filed Feb. 23, 2016, which claims priority of Japanese Patent Application No. JP 2015-038914 filed Feb. 27, 2015.

TECHNICAL FIELD

The present invention relates to an interrupting device, an interrupting method and a computer program that are for interrupting current flowing through an electrical wire.

BACKGROUND

In a power system installed in a vehicle, a battery and loads are connected by an electrical wire, and current is supplied from the battery to the loads via the electrical wire. The electrical wire has a resistance component. Thus, in the case where current flows through the electrical wire, the electrical wire generates heat.

Here, in the case where the amount of heat that is produced per unit time from the electrical wire as a result of current flow exceeds the amount of heat that is released per unit time from the electrical wire, the electrical wire temperature rises. In the case where current of a value that causes the electrical wire temperature to rise continues to flow through the electrical wire, the electrical wire temperature continues to rise, and there is a risk of smoke being generated or fire starting from the electrical wire. In order to prevent smoke being generated or fire starting from the electrical wire, it is naturally necessary to interrupt the current flowing through the electrical wire before smoke is generated or fire starts.

JP 5381248 discloses an interrupting device for interrupting current flowing through the electrical wire before smoke is generated or fire starts from the electrical wire. This interrupting device temporally computes the electrical wire temperature from the value of current flowing through the electrical wire. In the case where the computed electrical wire temperature is greater than or equal to a predetermined temperature, a switch provided on the electrical wire is turned off, and the current flowing through the electrical wire is interrupted. Thus, smoke being generated or fire starting is prevented, due to the electrical wire temperature not rising to greater than or equal to the predetermined temperature.

With the interrupting device described in JP 5381248, computation of the electrical wire temperature is suspended, in the case where a load has stopped operating, and the calculated electrical wire temperature approximately matches the ambient temperature of the electrical wire. Power consumption related to computation of the electrical wire temperature is thereby suppressed.

However, among the loads that the battery supplies, there are, for example, loads that require constant power supply. In this case, current constantly flows through the electrical wire.

In the case where the interrupting device described in JP 5381248 is used as an interrupting device for interrupting current constantly flowing through an electrical wire, computation of the electrical wire temperature is not suspended. Accordingly, with the interrupting device described in JP 5381248, there is a problem in that power consumption related to computation of the electrical wire temperature cannot be suppressed, in the case where current constantly flows through the electrical wire.

The present invention was made in view of this situation, and an object thereof is to provide an interrupting device, an interrupting method and a computer program that are able to suppress power consumption related to computation of the electrical wire temperature, even in the case where current constantly flows through the electrical wire.

SUMMARY

An interrupting device according to the present invention is an interrupting device for interrupting current flowing through an electrical wire, the device being characterized by including a computation unit that computes an electrical wire temperature, by temporally calculating a temperature difference between an ambient temperature of the electrical wire and the electrical wire temperature, based on current information indicating a value of current flowing through the electrical wire, and adding the ambient temperature to the calculated temperature difference, an interruption unit that interrupts current flowing through the electrical wire, in a case where the electrical wire temperature computed by the computation unit is greater than or equal to a threshold temperature, and a suspension unit that suspends computation of the electrical wire temperature, in a case where the temperature difference calculated by the computation unit is less than a predetermined temperature difference and the current value indicated by the current information is less than a predetermined current value.

The interrupting device according to the present invention is characterized by being provided with a resumption unit that resumes the computation suspended by the suspension unit, in a case where the current value indicated by the current information becomes greater than or equal to the predetermined current value.

The interrupting device according to the present invention is characterized by the suspension unit suspending the computation, in a case where the temperature difference computed by the computation unit is less than the predetermined temperature difference, the current value indicated by the current information is less than the predetermined current value, and an ignition switch of a vehicle is off.

The interrupting device according to the present invention is characterized by the computation unit computing the temperature difference, based on a previous temperature difference calculated previously, and the previous temperature difference to be used in an initial calculation of the temperature difference after the computation is resumed being a temperature difference calculated by the computation unit before the computation is suspended.

An interrupting method according to the present invention is an interrupting method for interrupting current flowing through an electrical wire, the method being characterized by computing an electrical wire temperature, by temporally calculating a temperature difference between an ambient temperature of the electrical wire and the electrical wire temperature, based on current information indicating a value of current flowing through the electrical wire, and adding the ambient temperature to the calculated temperature difference, interrupting current flowing through the electrical wire, in a case where the computed electrical wire temperature is greater than or equal to a threshold temperature, and suspending computation of the electrical wire temperature, in a case where the computed temperature difference is less than a predetermined temperature difference and the current value indicated by the current information is less than a predetermined current value.

A computer program according to the present invention is characterized by causing a computer to execute processing for computing an electrical wire temperature, by temporally calculating a temperature difference between an ambient temperature of the electrical wire and the electrical wire temperature, based on current information indicating a value of current flowing through the electrical wire, and adding the ambient temperature to the calculated temperature difference, instructing interruption of current flowing through the electrical wire, in a case where the computed electrical wire temperature is greater than or equal to a threshold temperature, and suspending computation of the electrical wire temperature, in a case where the computed temperature difference is less than a predetermined temperature difference and the current value indicated by the current information is less than a predetermined current value.

With the interrupting device, the interrupting method and the computer program according to the present invention, the temperature difference between the ambient temperature of the electrical wire and the electrical wire temperature is temporally calculated, based on current information indicating the value of current flowing through the electrical wire, and the calculated temperature difference is added to the ambient temperature. The electrical wire temperature is thereby computed. In the case where the computed electrical wire temperature is greater than or equal to a threshold temperature, the current flowing through the electrical wire is interrupted by, for example, turning off a switch provided on the electrical wire. Since the electrical wire temperature does not become greater than or equal to the threshold temperature, any risk of smoke being generated or fire starting from the electrical wire is prevented.

In the case where the temperature difference between the ambient temperature of the electrical wire and the electrical wire temperature is less than the predetermined temperature difference, and the current value indicated by current information is less than a predetermined current value, computation of the electrical wire temperature is suspended. Because computation of the electrical wire temperature is suspended when the electrical wire temperature is close to the ambient temperature and the value of current flowing through the electrical wire is less than a predetermined current value, power consumption related to computation of the electrical wire temperature can be suppressed, even in the case where current is constantly flowing through the electrical wire.

With the interrupting device according to the present invention, in the case where, in a state in which computation of the electrical wire temperature is suspended, the current value indicated by the current information becomes greater than or equal to a predetermined current value, computation of the electrical wire temperature is resumed. Computation of the electrical wire temperature is thus suspended, while the value of current flowing through the electrical wire is less than a predetermined current value.

With the interrupting device according to the present invention, computation of the electrical wire temperature is suspended in the case where the conditions that the computed temperature difference is less than a predetermined temperature difference and that the current value indicated by the current information is less than a predetermined current value are satisfied, and, furthermore, the ignition switch of the vehicle is off.

For example, in the case where power is supplied from the battery to a load via the electrical wire, the engine of the vehicle will have stopped operation when the ignition switch is off, and the probability of the value of current flowing through the electrical wire frequently fluctuating will be low and the value of current flowing through the electrical wire will be comparatively stable. Accordingly, there is an extremely low probability of the actual electrical wire temperature greatly increasing, while computation of the electrical wire temperature is suspended.

With the interrupting device according to the present invention, the temperature difference between the ambient temperature of the electrical wire and the electrical wire temperature is temporally calculated as aforementioned. In the calculation of the temperature difference, the temperature difference is calculated, based on a previous temperature difference calculated previously. In the case where the current value indicated by the current information becomes greater than or equal to a predetermined current value, for example, after computation of the electrical wire temperature has been suspended, computation of the electrical wire temperature is resumed. The previous temperature difference that is used in the initial calculation of the temperature difference after computation of the electrical wire temperature is resumed is a temperature difference calculated before suspending computation of the electrical wire temperature.

The temperature difference that is calculated increases, the larger the previous temperature difference. The electrical wire temperature, that is, the temperature difference between the ambient temperature and the electrical wire temperature, decreases over time, while computation of the electrical wire temperature is suspended. Accordingly, because the previous temperature difference that is used in the initial calculation of the temperature difference after computation of the electrical wire temperature is resumed is a temperature difference calculated before suspending computation of the electrical wire temperature, there is a low possibility that the computed electrical wire temperature will be less than the actual electrical wire temperature after computation is resumed. It thus becomes possible to interrupt the current flowing through the electrical wire before the actual electrical wire temperature exceeds the threshold temperature.

ADVANTAGEOUS EFFECTS OF INVENTION

According to the present invention, power consumption related to computation of the electrical wire temperature can be suppressed even in the case where current constantly flows through the electrical wire.

BRIEF DESCRIPTION OF DRAWINGS

FIG. 1 is a block diagram showing the configuration of a main section of a power system installed in a vehicle in the present embodiment.

FIG. 2 is a block diagram showing the configuration of a main section of an interrupting device.

FIG. 3 is a flowchart showing the procedure of operations that are executed by a CPU in a wakeup state.

FIG. 4 is a flowchart showing the procedure of operations that are executed by the CPU in a sleep state.

FIG. 5 is an illustrative diagram of operations of the interrupting device.

DETAILED DESCRIPTION OF PREFERRED EMBODIMENTS

Hereinafter, the present invention will be described in detail, based on the drawings which show embodiments thereof.

FIG. 1 is a block diagram showing the configuration of a main section of a power system 2 installed in a vehicle 1 in a first embodiment. The power system 2 is provided with an electrical wire 20, an interrupting device 21, a battery 22, a load 23, a switch control unit 24 and an ignition switch 25. The interrupting device 21 is provided on the electrical wire 20. One end of the electrical wire 20 is connected to a positive electrode of the battery 22. The other end of the electrical wire 20 is connected to one end of the load 23. A negative electrode of the battery 22 and the other end of the load 23 are grounded. The interrupting device 21 is connected to the switch control unit 24.

The battery 22 supplies power to the load 23 via the electrical wire 20 and the interrupting device 21. The load 23 is the electrical device that is installed in the vehicle 1, such as an ECU (Electronic Control Unit), for example.

Normally, the load 23 is constantly supplied with power from the battery 22 via the electrical wire 20 and the interrupting device 21. The interrupting device 21 interrupts current flowing through the electrical wire 20, in the case where the value of current flowing through the electrical wire 20 becomes greater than or equal to an interrupting current value that is set in advance. The interrupting current value is an extremely high current value at which there is a possibility of smoke being generated or fire starting from the electrical wire 20 in a short time.

The interrupting device 21 periodically computes the electrical wire temperature of the electrical wire 20, based on current information indicating the value of current flowing through the electrical wire 20. The interrupting device 21 interrupts current flowing through the electrical wire 20, not only in the case where the value of current flowing through the electrical wire 20 becomes greater than or equal to the interrupting current value but also in the case where the calculated electrical wire temperature is greater than or equal to a threshold temperature.

The ignition switch 25 is turned on or off by the switch control unit 24. The switch control unit 24 turns on the ignition switch 25 in the case where an engine (not illustrated) of the vehicle 1 operates, and turns off the ignition switch 25 in the case where operation of the engine is stopped. The switch control unit 24 outputs an ignition signal indicating whether the ignition switch 25 is on or off to the interrupting device 21.

The ignition signal is a binary signal that is constituted by a high-level or low-level voltage. In the case where the ignition switch 25 is on, the ignition signal that is output by the switch control unit 24 shows the high-level voltage. In the case where the ignition switch 25 is off, the ignition signal that is output by the switch control unit 24 shows the low-level voltage.

The interrupting device 21 suspends and resumes computation of the electrical wire temperature, according to current information, the computed electrical wire temperature, and the ignition signal that is input from the switch control unit 24.

FIG. 2 is a block diagram showing the configuration of a main section of the interrupting device 21. The interrupting device 21 has an N-channel FET (Field-Effect Transistor) 30, a drive circuit 31, a current detection unit 32, a temperature detection unit 33 and a microcomputer (hereinafter, denotes as MICOM) 34.

A FET 30 is provided on the electrical wire 20. A drain of the FET 30 is connected to the positive electrode of the battery 22 via the electrical wire 20, and a source of the FET 30 is connected to one end of the load 23 via the electrical wire 20. The gate of the FET 30 is connected to the drive circuit 31. The drive circuit 31 is connected to the current detection unit 32. The drive circuit 31, the current detection unit 32 and the temperature detection unit 33 are separately connected to the MICOM 34. The MICOM 34 is connected also to the switch control unit 24.

The FET 30 functions as a switch. In the case where the voltage being applied to the gate of the FET 30 is greater than or equal to a given voltage, it is possible for current to flow between the drain and the source of the FET 30, and the FET 30 is on. In the case where the voltage being applied to the gate of the FET 30 is less than a given voltage, current does not flow between the drain and the source of the FET 30, and the FET 30 is off. The drive circuit 31 turns the FET 30 on or off, by adjusting the voltage being applied to the gate of the FET 30.

The current detection unit 32 detects the value of current flowing through the electrical wire 20, and outputs analog current information indicating the detected current value to the drive circuit 31 and the MICOM 34. In the current detection unit 32, current obtained by dividing the value of current flowing through the electrical wire 20 by a predetermined number flows through a resistor, and the voltage value between both ends of the resistor is output to the MICOM 34 as analog current information. The predetermined number is 4000, for example.

The drive circuit 31 normally has the FET 30 turned on. The drive circuit 31 turns off the FET 30 in the case where the current value that is indicated by the current information input from the current detection unit 32 is greater than or equal to the interrupting current value, and interrupts current flowing through the electrical wire 20. Also, the drive circuit 31 receives, from the MICOM 34, input of an interrupt instruction instructing to interrupt current flowing through the electrical wire 20. In the case where the interrupt instruction is input from the MICOM 34, the drive circuit 31 turns off the FET 30 and interrupts current flowing through the electrical wire 20. The drive circuit 31 functions as an interruption unit.

The temperature detection unit 33 is constituted using a thermistor, for example, and detects the ambient temperature of the electrical wire 20. The temperature detection unit 33 outputs temperature information indicating the detected ambient temperature to the MICOM 34.

The MICOM 34 periodically computes the electrical wire temperature of the electrical wire 20, based on the current information input from the current detection unit 32 and the temperature information input from the temperature detection unit 33. The MICOM 34 outputs the interrupt instruction to the drive circuit 31, in the case where the calculated electrical wire temperature is greater than or equal to a threshold temperature. The drive circuit 31 thereby turns off the FET 30 and interrupts current flowing through the electrical wire 20.

The ignition signal is input to the MICOM 34 from the switch control unit 24. The MICOM 34 suspends computation of the electrical wire temperature, based on the current information input from the current detection unit 32, the computed electrical wire temperature, and the ignition signal input from the switch control unit 24. The MICOM 34 resumes computation of the electrical wire temperature based on the current information input from the current detection unit 32 and the ignition signal input from the switch control unit 24.

The MICOM 34 has a CPU (Central Processing Unit) 40, a RAM (Random Access Memory) 41, a ROM (Read-Only Memory) 42, input units 43, 44 and 45, an output unit 46, a determination unit 47, an A/D (Analog/Digital) conversion unit 48, a timer 49 and an OR circuit 50. The OR circuit 50 has two input terminals and one output terminal.

The CPU 40, the RAM 41, the ROM 42, the input units 43 and 45, the output unit 46, the determination unit 47, and the A/D conversion unit 48 are respectively connected to a bus 51. The input unit 43 is connected to the switch control unit 24, apart from the bus 51. The A/D conversion unit 48 is separately connected to the input unit 44, the determination unit 47 and the timer 49, apart from the bus 51. The input unit 44, the input unit 45 and the output unit 46 are further respectively connected to the current detection unit 32, the temperature detection unit 33 and the drive circuit 31. In relation to the OR circuit 50, one input terminal is connected to the switch control unit 24, the other input terminal is connected to the determination unit 47, and the output terminal is connected to the CPU 40.

A control program P1 is stored in the ROM 42. The CPU 40 performs processing such as computation of the electrical wire temperature of the electrical wire 20 and interruption of current flowing through the electrical wire 20, by executing the control program P1 that is stored in the ROM 42. The control program P1 functions as a computer program.

The states of the CPU 40 include a wakeup state in which processing is executed at a given short interval and power consumption is high, and a sleep state in which processing is executed at a given long interval and power consumption is low. The CPU 40, when in the wakeup state, performs computation of the electrical wire temperature and interruption of current. The CPU 40, when in the sleep state, suspends computation of the electrical wire temperature and does not interrupt current flowing through the electrical wire 20. Also, the CPU 40 performs transition to the wakeup state and transition to the sleep state.

Data is temporarily saved in the RAM 41. Writing of data to the RAM 41 and reading out of data from the RAM 41 are performed by the CPU 40. The RAM 41 is used in the process of the CPU 40 executing operations.

The ignition signal is input to the input unit 43 from the switch control unit 24. The input unit 43 notifies the contents that are indicated by the ignition signal to the CPU 40, in the case where the ignition signal is input from the switch control unit 24. The contents that are indicated by the ignition signal are used in the case where the CPU 40 determines whether to transition to the sleep state.

Analog current information is input to the input unit 44 from the current detection unit 32. The input unit 44, in the case where analog current information is input from the current detection unit 32, outputs the input current information to the A/D conversion unit 48.

The timer 49 periodically outputs a conversion instruction instructing to convert the analog current information into digital current information to the A/D conversion unit 48.

The A/D conversion unit 48 converts the analog current information input from the input unit 44 into digital current information, whenever the conversion instruction is input from the timer 49. Specifically, the A/D conversion unit 48 converts the aforementioned analog voltage value between the both ends of the resistor into a digital voltage value. The resultant digital voltage value is digital current information.

The voltage value between the both ends of the resistor in the current detection unit 32 increases, the larger the value of current flowing through the electrical wire 20. The digital current information, that is, the digital voltage value, thus increases, the larger the value of current flowing through the electrical wire 20.

The digital current information resulting from the conversion performed by the A/D conversion unit 48 is acquired by the CPU 40. This digital current information is used in the case where the CPU 40 determines whether to transition to the sleep state.

Also, the A/D conversion unit 48 outputs the resultant digital current information to the determination unit 47, whenever conversion is performed.

The determination unit 47 determines whether the current value that is indicated by the current information input from the A/D conversion unit 48 is greater than or equal to a reference current value. Specifically, the determination unit 47 determines whether the digital current information, that is, the digital voltage value, is greater than or equal to a reference value. The reference value is a digital voltage value that is output by the A/D conversion unit 48 in the case where current of the reference current value flows through the electrical wire 20. Also, the reference current value is sufficiency smaller than the aforementioned interrupting current value.

A start instruction instructing to start the determination of whether the current value that is indicated by the current information input from the A/D conversion unit 48 is greater than or equal to the reference current value, and a stop instruction instructing to stop this determination are input to the determination unit 47. The determination unit 47 starts the determination in the case where the start instruction is input, and stops the determination in the case where the stop instruction is input.

The determination unit 47 outputs a determination signal indicating the result of the determination of whether the current value indicated by the current information is greater than or equal to the reference current value to the other terminal of the OR circuit 50. The determination signal is a binary signal that is constituted by a high-level or low-level voltage, similarly to the ignition signal. In the case where the determination unit 47 determines that the current value that is indicated by the current information input from the A/D conversion unit 48 is greater than or equal to the reference current value, the determination signal that is output from the determination unit 47 shows the high-level voltage. In the case where the determination unit 47 determines that the current value that is indicated by the current information input from the A/D conversion unit 48 is less than the reference current value, the determination signal that is output from the determination unit 47 shows the low-level voltage.

In relation to the OR circuit 50, the ignition signal is input to one input terminal from the switch control unit 24, and the determination signal is input to the other input terminal from the determination unit 47. The OR circuit 50 outputs a signal that is based on the ignition signal and the determination signal input to the two input terminals to the CPU 40 from the output terminal.

The output signal of the OR circuit 50 shows the high-level voltage, in the case where at least one of the determination signal and the ignition signal shows the high-level voltage. The output signal of the OR circuit 50 shows the low-level voltage, in the case where both the determination signal and the ignition signal show the low-level voltage. Accordingly, the output signal of the OR circuit 50 is a binary signal constituted by a high-level or low-level voltage. The output signal of the OR circuit is used in the determination of whether to transition to the wakeup state.

Temperature information is input to the input unit 45 from the temperature detection unit 33. The temperature information input to the input unit 45 is acquired by the CPU 40.

The output unit 46 outputs the interrupt instruction to the drive circuit 31, in accordance with an instruction from the CPU 40.

The CPU 40, when in the wakeup state, periodically computes the electrical wire temperature of the electrical wire 20. In the computation of the electrical wire temperature, the CPU 40 computes the temperature difference between the ambient temperature of the electrical wire 20 and the electrical wire temperature. The CPU 40 computes the temperature difference between the ambient temperature of the electrical wire 20 and the electrical wire temperature, by substituting the previous temperature difference calculated previously, the current value that is indicated by the current information and the ambient temperature of the electrical wire 20 that is indicated by the temperature information into a computation equation. The previous temperature difference is stored in the RAM 41. The CPU 40 stores the calculated temperature difference in the RAM 41 as the previous temperature difference, whenever the temperature difference is calculated.

In the case where the previous temperature difference, the current value that is indicated by the current information and the ambient temperature that is indicated by the temperature information are respectively denoted as $\Delta Tp$, Iw and Ta, the computation equations (1) and (2) that are used in calculation of the temperature difference between the ambient temperature of the electrical wire 20 and the electrical wire temperature is represented as follows:

$$\Delta Tw = \Delta Tp \times \exp(-\Delta t/\tau) + Rth \times Rw \times Iw^2 \times (1-\exp(-\Delta t/\tau)) \quad (1)$$

$$Rw = Ro \times (1 - \kappa \times (Ta + \Delta Tp - To)) \quad (2)$$

The variables and constants that are used in the computation equations (1) and (2) will be described. The units of the variables or constants will also be indicated in the description of the variables and constants. $\Delta Tw$, $\Delta Tp$, Iw and Ta are, as aforementioned, respectively the calculated temperature difference (° C.), the previous temperature difference (° C.), the value (A) of current flowing through the electrical wire 20, and the ambient temperature (° C.) of the electrical wire 20. $\Delta t$ is the computation cycle (s) of computation of the electrical wire temperature by the CPU 40 in the wakeup state. $\tau$ is the electrical wire heat dissipation time constant (s) of the electrical wire 20.

Rth is the electrical wire heat resistance (° C./W) of the electrical wire 20, and Rw is the electrical wire resistance ($\Omega$) of the electrical wire 20. To is a predetermined temperature (° C.), and Ro is the electrical wire resistance ($\Omega$) at the temperature To. $\kappa$ is the electrical wire resistance temperature coefficient (/° C.) of the electrical wire 20. $\Delta Tw$, $\Delta Tp$, Iw and Ta are variables, and $\Delta t$, $\tau$, Rth, Ro, $\kappa$ and To are constants that are set in advance.

Because the value of the first term of the computation equation (1) falls as the length of the computation cycle $\Delta t$ increases, the first term of the computation equation (1) represents heat dissipation of the electrical wire 20. Also, because the value of the second term of the computation equation (1) rises as the length of the computation cycle $\Delta t$ increases, the second term of the computation equation (1) represents heat generation of the electrical wire 20.

The computation equations (1) and (2) are each stored in the ROM 42 in advance. The computation equations (1) and (2) that are stored in the ROM 42 are read out by the CPU 40.

FIG. 3 is a flowchart showing the procedure of operations that are executed by the CPU 40 in the wakeup state. The following operations that are executed by the CPU 40 in the wakeup state are executed periodically. The cycle of the operations that are executed by the CPU 40 in the wakeup state is the cycle at which the electrical wire temperature is computed.

The CPU 40 acquires current information indicating the value of current flowing through the electrical wire 20 from the A/D conversion unit 48 (step S1), reads out the previous temperature difference from the RAM 41 (step S2), and acquires temperature information from the input unit 45 (step S3).

Note that the interval at which the current information that is acquired from the A/D conversion unit 48 and the temperature information that is acquired from the input unit 45 are updated is less than or equal to the computation cycle of the CPU 40.

Next, the CPU 40, by substituting the current value that is indicated by the current information acquired at step S1, the previous temperature difference read out at step S2 and the ambient temperature that is indicated by the temperature information acquired at step S3 into the computation equations (1) and (2), calculates the temperature difference between the ambient temperature of the electrical wire 20 and the electrical wire temperature (step S4). Thereafter, the CPU 40 stores the calculated temperature difference in the RAM 41 as the previous temperature difference (step S5).

Next, the CPU 40 calculates the electrical wire temperature of the electrical wire 20 by adding the temperature difference calculated at step S4 to the ambient temperature of the electrical wire 20 that is indicated by the temperature information acquired at step S3 (step S6). As mentioned above, the CPU 40 computes the electrical wire temperature by executing steps S1 to S6.

Next, the CPU 40 determines whether the electrical wire temperature calculated at step S6 is greater than or equal to a threshold temperature (step S7). The threshold temperature is stored in advance in the ROM 42 and is read out from the ROM 42 by the CPU 40.

The CPU 40, in the case where it is determined that the electrical wire temperature is greater than or equal to the threshold temperature (S7: YES), instructs the output unit 46 to output the interrupt instruction to the drive circuit 31 (step S8). In this way, the CPU 40 instructs the drive circuit 31 to interrupt current flowing through the electrical wire 20, and the drive circuit 31 turns off the FET 30. The current flowing through the electrical wire 20 is thereby interrupted.

After the CPU 40 has executed step S8, the CPU 40 ends the processing.

Note that since the current flowing through the electrical wire 20 is interrupted in the case where step S8 is executed by the CPU 40, there is a possibility that computation of the electrical wire temperature will be unnecessary. The interrupting device 21 may be configured to not execute step S1 again until a specific condition is satisfied, in the case where the CPU 40 has executed step S8 and ended the operations. The specific condition is that a reception unit which is not illustrated receives an instruction to resume the operations of the CPU 40 from the user, for example.

The CPU 40, in the case where it is determined that the electrical wire temperature is less than the threshold temperature (S7: NO), determines whether the ignition switch 25 is off, based on the ignition signal being input to the input unit 43 (step S9). The CPU 40, in the case where the ignition signal being input to the input unit 43 shows the low-level voltage, determines that the ignition switch 25 is off. The CPU 40, in the case where the ignition signal being input to the input unit 43 shows the high-level voltage, determines that the ignition switch 25 is not off, that is, that the ignition switch 25 is on.

The CPU 40, in the case where it is determined that the ignition switch 25 is off (S9: YES), determines whether the temperature difference calculated at step S4 is less than a reference temperature difference (step S10). The reference temperature difference is stored in advance in the ROM 42 and is read out from the ROM 42 by the CPU 40.

The CPU 40, in the case where it is determined that the temperature difference is less than the reference temperature difference (S10: YES), determines whether the current value that is indicated by the current information acquired at step S1, that is, the value of current flowing through the electrical wire 20, is less than the reference current value (step S11). The digital current information that is acquired by the CPU 40 at step S1 is a digital voltage value as aforementioned. Accordingly, specifically, the CPU 40 determines whether the current information, that is, the digital voltage value, is less than the aforementioned reference value corresponding to the reference current value.

The digital voltage value being less than the reference value means that the current value indicated by the current information is less than the reference current value. The digital voltage value being greater than or equal to the reference value means that the current value indicated by the current information is greater than or equal to the reference current value.

The CPU 40, in the case where it is determined that the current value is less than the reference current value (S11: YES), outputs a determination start instruction to the determination unit 47 (step S12). Thereby, the start instruction is input to the determination unit 47, the determination unit 47 starts the determination of whether the current value that is indicated by the digital current information resulting from the conversion performed by the A/D conversion unit 48 is greater than or equal to the reference current value, and the determination signal is output to the OR circuit 50 from the determination unit 47.

The CPU 40, after executing step S12, transitions to the sleep state (step S13). Specifically, the CPU 40 lengthens the interval for executing processing.

The CPU 40, in the case where it is determined that the ignition switch 25 is not off (S9: NO), in the case where it is determined that the temperature difference is greater than or equal to the reference temperature difference (S10: NO), or in the case where it is determined that the current value is greater than or equal to the reference current value (S11: NO), ends the operations. In the case where the operations are thus ended, the CPU 40, when the next cycle arrives, again executes step S1 and computes the electrical wire temperature.

The CPU 40, after executing step S13, ends the operations. In this case, the CPU 40 is in the sleep state. The CPU 40 in the sleep state executes different operations to the operations that are executed by the CPU 40 in the wakeup state, and does not compute the electrical wire temperature.

Conditions for the CPU 40 to transition from the wakeup state to the sleep state include the ignition switch 25 being off and the current value indicated by the current information being less than the reference current value. Accordingly, at the point in time at which the CPU 40 transitions from the wakeup state to the sleep state, the ignition signal and the determination signal both show the low-level voltage, and the output signal of the OR circuit 50 shows the low-level voltage.

FIG. 4 is a flowchart showing the procedure of operations that are executed by the CPU 40 in the sleep state. The CPU 40 in the sleep state periodically executes the following operations. First, the CPU 40 determines whether the output signal of the OR circuit 50 shows the high-level voltage (step S21).

The CPU 40, in the case where it is determined that the output signal does not show the high-level voltage, that is, where the output signal shows the low-level voltage (S21: NO), ends the operations.

Thus, in the case where the operations are ended, the CPU 40 executes step S21 again when the next cycle arrives.

The CPU 40, in the case where it is determined that the output signal shows the high-level voltage, that is, in the case where the ignition switch 25 has switched to on or the current value indicated by the current information is greater than or equal to the reference current value (S21: YES), outputs a determination stop instruction to the determination unit 47 (step S22). The stop instruction is thereby input to the determination unit 47 from the CPU 40, and the determination unit 47 stops determining whether the current value that is shown by the digital current information resulting from the conversion performed by the A/D conversion unit 48 is greater than or equal to the reference current value.

The CPU 40, after executing step S22, transitions to the wakeup state (step S13). Specifically, the CPU 40 shortens the interval for executing processing. Thereafter, the CPU 40 ends the operations. The CPU 40, in the case where the operations have thus been ended, is in the wakeup state, and thus resumes computation of the electrical wire temperature.

In the initial computation of the temperature difference after the CPU 40 has transitioned from the sleep state to the wakeup state, the previous temperature difference stored to the RAM 41 is used. In other words, the previous temperature difference that is used in the initial computation of the temperature difference after the CPU 40 has transitioned from the sleep state to the wakeup state is the temperature difference calculated before transitioning to the sleep state.

FIG. 5 is an illustrative diagram of operations of the interrupting device 21. Shift in the temperature difference computed by the CPU 40 and shift in the current value that is indicated by the current information are shown in FIG. 5. In the shift in the temperature difference between the ambient temperature of the electrical wire 20 and the electrical wire temperature, the thick line indicates the temperature difference that is actually computed by the CPU 40, and the thin line indicates the temperature difference that is not actually computed by the CPU 40. The temperature difference that is indicated with the thin line is the temperature difference that is calculated in the case where it is assumed that the CPU 40 has performed computation.

Also, $\Delta Tr$ indicates the reference temperature difference, and Ir indicates the reference current value.

The CPU 40 in the wakeup state periodically computes the electrical wire temperature, while the ignition switch 25 is on, or the calculated temperature difference is greater than or equal to the reference temperature difference, or the current value that is indicated by the current information is greater than or equal to the reference current value. The CPU 40, as aforementioned, periodically calculates the temperature difference between the ambient temperature of the electrical wire 20 and the electrical wire temperature, based on current information indicating the value of current flowing through the electrical wire 20 and the previous temperature difference, and adds the calculated temperature difference to the ambient temperature of the electrical wire 20.

The electrical wire temperature is thereby computed. The CPU 40 functions as a computation unit.

A situation where the electrical wire temperature computed by the CPU 40 is greater than or equal to the threshold temperature is not shown in FIG. 5. However, the CPU 40, in the case where the computed electrical wire temperature is greater than or equal to the threshold temperature, causes the output unit 46 to output the interrupt instruction to instruct the drive circuit 31 to interrupt current flowing through the electrical wire 20, and the drive circuit 31 turns off the FET 30.

Since the electrical wire temperature of the electrical wire 20 does not become greater than or equal to the threshold temperature, any risk of smoke being generated or fire starting from the electrical wire 20 can thereby be prevented.

In the case where the ignition switch 25 turns off and the engine stops, the load 23 stops the main operations and dark current, for example, is supplied to the load 23 from the battery 22. In the case where the ignition switch 25 has turned off, the current value that is indicated by the current information will thus be less than the reference current value Ir, as shown in FIG. 5.

Due to the decrease in the current value that is indicated by the current information, the temperature difference between the ambient temperature of the electrical wire 20 and the electrical wire temperature gradually decreases. The CPU 40 in the wakeup state, in the case where the ignition switch 25 is off, the calculated temperature difference is less than the reference temperature difference and the current value that is indicated by the current information is less than the reference current value, transitions to the sleep state, and suspends computation of the electrical wire temperature.

Thus, because computation of the electrical wire temperature is suspended, when the electrical wire temperature is close to the ambient temperature of the electrical wire 20 and the current value flowing through the electrical wire 20 is less than the reference current value, power consumption related to computation of the electrical wire temperature can be suppressed, even in the case where current constantly flows through the electrical wire 20.

The CPU 40 also functions as a suspension unit.

In the case where the ignition switch 25 is off, the value of current to be supplied to the load 23 is low and stable. In the case where the ignition switch 25 is off, the probability of the value of current flowing through the electrical wire 20 frequently fluctuating is thus low, and the value of current flowing through the electrical wire 20 is comparatively stable. Accordingly, as a result of the condition of whether the ignition switch 25 is off being added to the condition of whether to transition from the wakeup state to the sleep state, the probability of the actual electrical wire temperature rising greatly is extremely low, while the CPU 40 has suspended computation of the electrical wire temperature.

Supposing that the temperature difference is computed after computation of the electrical wire temperature is suspended, in the example shown in FIG. 5, the temperature difference between the ambient temperature of the electrical wire 20 and the electrical wire temperature gradually decreases and stabilizes at zero, while the current value that is indicated by the electrical wire information is less than the reference current value Ir.

At the point in time at which the CPU 40 transitions to the sleep state, or in other words, at the point in time at which computation of the electrical wire temperature is suspended, the ignition switch 25 is off, and the current value that is indicated by the current information is less than the reference current value Ir. The output signal of the OR circuit 50 at the point in time at which the CPU 40 transitions to the sleep state thus shows the low-level voltage. The CPU 40 is in the sleep state and suspends computation of the electrical wire temperature, while the output signal of the OR circuit 50 shows the low-level voltage.

When the current value that is indicated by the current information becomes greater than or equal to the reference current value Ir, due to short circuiting of the connection nodes between the electrical wire 20 and the load 23, for example, in the case where the CPU 40 is in the sleep state, the output signal of the OR circuit 50 shows the high-level voltage, and the CPU 40 transitions to the wakeup state. The CPU 40 then resumes the suspended periodical computation of the electrical wire temperature. Computation of the electrical wire temperature can thus be suspended, while the value of current flowing through the electrical wire 20 is less than the reference current value Ir.

The CPU 40 also functions as a resumption unit.

Also, the previous temperature difference that is used by the CPU 40 in the initial calculation of the electrical wire temperature after resuming the periodical computation of the electrical wire temperature is a temperature difference calculated before suspending computation of the electrical wire temperature. In the example of FIG. 5, the previous temperature difference that is used in the initial calculation of the electrical wire temperature after resuming the periodical computation of temperature difference is the reference temperature difference $\Delta Tr$. The temperature difference between the ambient temperature of the electrical wire 20 and the electrical wire temperature thus shifts from the reference temperature difference $\Delta Tr$, after computation of the electrical wire temperature is resumed.

It is estimated that the temperature difference at the point in time at which computation of the electrical wire temperature is resumed will be smaller than the temperature difference calculated before suspending computation of the electrical wire temperature. Accordingly, there is a low possibility that the electrical wire temperature that is computed by the CPU 40 after resuming computation of the electrical wire temperature will be less than the actual electrical wire temperature. Accordingly, it becomes possible to interrupt current flowing through the electrical wire 20 before the actual electrical wire temperature becomes greater than or equal to the threshold temperature.

Also, as aforementioned, the temperature difference between the ambient temperature of the electrical wire 20 and the electrical wire temperature is calculated based on a previous temperature difference, and the calculated temperature difference is used as the previous temperature difference in the next calculation of the temperature difference. Accordingly, even in the case where the temperature difference at the point in time at which computation of the electrical wire temperature is resumed differs from the actual temperature difference, the calculated temperature difference approaches the actual temperature difference, whenever calculation of the temperature difference is repeated.

In the case where the current value that is indicated by the current information, that is, the value of current flowing through the electrical wire 20, becomes less than the reference current value Ir, and the temperature difference between the ambient temperature of the electrical wire 20 and the electrical wire temperature becomes less than the reference temperature difference $\Delta Tr$, in a state in which the ignition switch 25 is off, the CPU 40 again transitions from the wakeup state to the sleep state.

In the case where the CPU 40 transitions to the sleep state, the output signal of the OR circuit 50 shows the low-level voltage. In the case where the ignition switch 25 turns on and the output signal of the OR circuit 50 shows the high-level voltage, the CPU 40 transitions from the sleep state to the wakeup state, and resumes computation of the electrical wire temperature. The previous temperature difference that is used in the initial calculation of the temperature difference, after computation of the electrical wire temperature is resumed, is a temperature difference calculated before suspending computation of the electrical wire temperature. In the example of FIG. 5, the previous temperature difference that is used in the initial calculation of the electrical wire temperature after the ignition switch 25 turns on and computation of the electrical wire temperature resumes is the reference temperature difference $\Delta Tr$.

Note that the previous temperature difference that is used in the initial calculation of the temperature difference after resuming computation of the electrical wire temperature need not be a temperature difference calculated before resuming computation of the electrical wire temperature, and may be a temperature difference set in advance. Here, the temperature difference set in advance is, for example, a temperature difference greater than or equal to the reference temperature difference $\Delta Tr$. Also in this case, the electrical wire temperature that is computed by the CPU 40 after computation of the electrical wire temperature is resumed will not be less than the actual electrical wire temperature.

Also, the CPU 40 in the wakeup state need not compute the electrical wire temperature periodically, and need only compute the electrical wire temperature temporally. In the case where the electrical wire temperature is not computed periodically, the interrupting device 21 has a clocking unit that clocks the interval at which the electrical wire temperature is computed, and the CPU 40 computes the electrical wire temperature, by substituting the time period clocked by the clocking unit for $\Delta t$ in the computation equations (1) and (2).

Furthermore, the CPU 40, in the case where the calculated temperature difference is less than the reference temperature difference $\Delta Tr$, and the current value that is indicated by the current information is less than the reference current value Ir, may transition to the sleep state and suspend computation of the electrical wire temperature, regardless of the on and off state of the ignition switch 25. In this case, the interrupting device 21 does not have the OR circuit 50, for example, and the determination unit 47 is directly connected to the CPU 40. In the case where the current value that is indicated by the current information becomes greater than or equal to the reference current value Ir and the determination signal shows the high-level voltage, the CPU 40 then transitions to the wakeup state and resumes computation of the electrical wire temperature.

Also, the previous temperature difference is not limited to the temperature difference calculated by the CPU 40 the last time, and may, for example, be a temperature difference calculated by the CPU 40 the time before last.

The disclosed embodiments are considered in all respects to be illustrative and not restrictive. The scope of the invention is indicated by the claims rather than by the foregoing description, and all changes that come within the meaning and range of equivalency of the claims are intended to be embraced therein.

The invention claimed is:

1. An interrupting device for interrupting current flowing through an electrical wire, comprising:
   a current detection unit detecting a current flowing through the electrical wire so as to provide a current information;
   a temperature detection unit detecting an ambient temperature of the electrical wire; and
   a computation unit that computes a computed electrical wire temperature, by temporally calculating a temperature difference between an ambient temperature of the electrical wire, and the computed electrical wire temperature, based on current information, wherein the current information indicates a value of current flowing through the electrical wire, and adding the ambient temperature to the calculated temperature difference;
   an interruption unit that interrupts current flowing through the electrical wire, in a case where the computed electrical wire temperature computed by the computation unit is greater than or equal to a threshold temperature; and
   a suspension unit suspends computation of the electrical wire temperature, in a case where the temperature difference calculated by the computation unit is less than a predetermined temperature difference and the current value indicated by the current information detected by the current detection unit is less than a predetermined current value.

2. The interrupting device according to claim 1, comprising:
   a resumption unit that resumes the computation suspended by the suspension unit, in a case where the current value indicated by the current information becomes greater than or equal to the predetermined current value.

3. The interrupting device according to claim 1, wherein the suspension unit suspends the computation, in a case where the temperature difference computed by the computation unit is less than the predetermined temperature difference, the current value indicated by the current information is less than the predetermined current value, and an ignition switch of a vehicle is off.

4. The interrupting device according to claim 1, wherein the computation unit computes the temperature difference, based on a previous temperature difference calculated previously, and
   the previous temperature difference to be used in an initial calculation of the temperature difference after the computation is resumed is a temperature difference calculated by the computation unit before the computation is suspended.

5. An interrupting method for interrupting current flowing through an electrical wire, comprising:
   computing, by a computation unit, an electrical wire temperature, by temporally calculating a temperature difference between an ambient temperature of the electrical wire and the electrical wire temperature, based on current information indicating a value of current flowing through the electrical wire, and adding the ambient temperature to the calculated temperature difference;
   interrupting, by an interruption unit, current flowing through the electrical wire, in a case where the computed electrical wire temperature is greater than or equal to a threshold temperature; and
   suspending, by a suspension unit, computation of the electrical wire temperature, in a case where the computed temperature difference is less than a predetermined temperature difference and the current value indicated by the current information is less than a predetermined current value.

6. A computer program for causing a computer to execute processing for:
   computing, by a computation unit, an electrical wire temperature, by temporally calculating a temperature difference between an ambient temperature of the electrical wire and the electrical wire temperature, based on current information indicating a value of current flowing through the electrical wire, and adding the ambient temperature to the calculated temperature difference;

instructing, by an interruption unit, interruption of current flowing through the electrical wire, in a case where the computed electrical wire temperature is greater than or equal to a threshold temperature; and suspending, by a suspension unit, computation of the electrical wire temperature, in a case where the computed temperature difference is less than a predetermined temperature difference and the current value indicated by the current information is less than a predetermined current value.

7. The interrupting device according to claim 2, wherein the computation unit computes the temperature difference, based on a previous temperature difference calculated previously, and the previous temperature difference to be used in an initial calculation of the temperature difference after the computation is resumed is a temperature difference calculated by the computation unit before the computation is suspended.

8. The interrupting device according to claim 3, wherein the computation unit computes the temperature difference, based on a previous temperature difference calculated previously, and the previous temperature difference to be used in an initial calculation of the temperature difference after the computation is resumed is a temperature difference calculated by the computation unit before the computation is suspended.

\* \* \* \* \*